R. B. TEWKSBURY.
DIE STOCK.
APPLICATION FILED MAY 4, 1912.
1,048,108.
Patented Dec. 24, 1912.
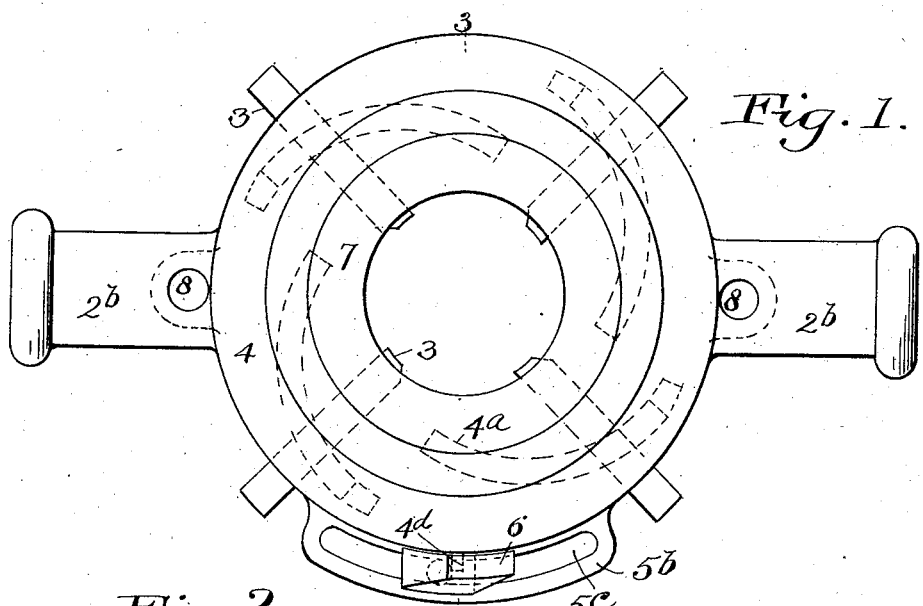
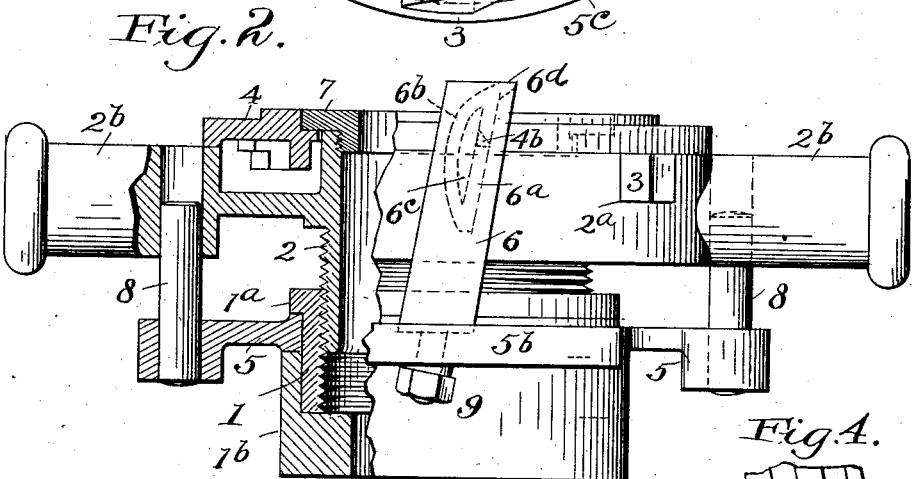
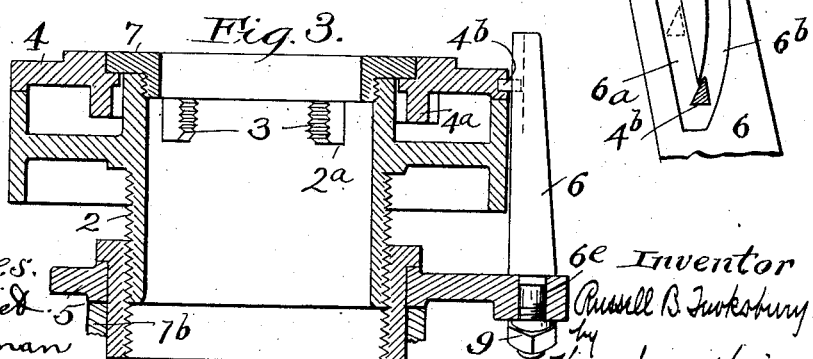
Witnesses.
E. B. Gilchrist
E. M. Freeman
Inventor
Russell B. Tewksbury
by
Thurston & Kwis
Attorneys

UNITED STATES PATENT OFFICE.

RUSSELL B. TEWKSBURY, OF CLEVELAND, OHIO.

DIE-STOCK.

1,048,108.

Specification of Letters Patent.

Patented Dec. 24, 1912.

Application filed May 4, 1912. Serial No. 695,282.

*To all whom it may concern:*

Be it known that I, RUSSELL B. TEWKSBURY, a citizen of the United States, residing at Cleveland, in the county of Cuyahoga and State of Ohio, have invented a certain new and useful Improvement in Die-Stocks, of which the following is a full, clear, and exact description.

This invention relates to improvements in the kind of die stocks which have a capacity for adjustment such as will adapt them for threading work of different diameters. The object of the invention is to provide such a die stock with means which, regardless of the size to which the tool is set, will automatically withdraw the dies from the work after the desired length of thread has been cut, and will hold them in the withdrawn position while the work holder and die carrier are being returned to the proper relative positions for starting the cutting of a thread, and will cause the dies to be returned to their working positions when the die carrier and work holder have reached the above mentioned starting position.

The invention consists in the construction and combination of parts hereinafter described and pointed out definitely in the claims.

In the drawing, Figure 1 is a front end view of a die stock embodying the invention. Fig. 2 is a side elevation with one side of the die stock in central section. Fig. 3 is a longitudinal section at right angles to the plane at which the sectional part of Fig. 2 is taken. Fig. 4 is an inside view of a part of the templet bar showing the rear ends of the guide grooves 6$^a$ and 6$^b$.

Referring to the parts by letters, 1 represents the work holder which is of familiar construction, being a built up member of tubular form, so that the pipe or other cylindrical piece of work to be threaded may be passed through it, and being provided with suitable means whereby it may be clamped to said work. The die carrier 2 is likewise tubular and is capable of moving rotatably and longitudinally relative to the work holder. In the construction shown the die carrier has its rear end externally threaded so that it may screw into the internally threaded work holder, wherefore, as the die carrier is turned relatively to the work holder, it will move longitudinally relative thereto at such a rate as is determined by the pitch of the engaging threads upon these two parts.

Near the front end of the die carrier are radially movable guideways 2$^a$ in which the radially movable dies or chasers 3 are movably mounted. A cam plate 4 is rotatably mounted upon the cylindrical front end of the die carrier, and is held thereon by the cap 7. The cam plate 4 has on its rear face eccentric scrolls 4$^a$ which engage the dies, so that, as the cam plate is turned upon the die carrier, all of the dies are moved simultaneously and equally inward or outward as the case may be. The die stock, to the extent above described, is of familiar construction.

5 represents a ring which is rotatably mounted upon the work holder, but is held against longitudinal movement relative thereto. In the particular construction shown this ring lies in a circumferential groove formed between the flange 1$^a$ on one of the parts of the work holder and the front end of the other part 1$^b$ of said work holder. This ring is compelled to turn with the die carrier by means of two pins 8, fixed to the ring, and extending longitudinally forward therefrom through holes in the handle sockets 2$^b$ of the die carrier,—the pins being freely movable in said holes.

6 represents the templet bar which is fixed to the ring 5 and projects forward therefrom alongside of the die carrier. The inner face of this templet bar is provided with an endless guide for controlling the position of the cam plate 5. This guide, as shown, is a groove having two branches 6$^a$ and 6$^b$ which extend in a general forward and backward direction and which are joined together at their front and rear ends. A lug 4$^b$ projects out from the cam plate into said groove. The branch 6$^a$ is inclined as shown, at such an angle to the axis of the tool that, as the lug 4$^b$ travels rearward in said groove while the dies are cutting the thread on the work, the cam plate will be turned enough to cause the required recession of the dies to impart the desired taper to the thread which is being cut. If the eccentricity of the cam scrolls 4$^a$ is great enough, the dies, due to the outthrust of the work, will move in the receding direction and cause the cam plate to move correspondingly, and, in that event, one inclined wall of the groove 6$^a$ will properly restrain and control such movement while the thread is being cut. If, however, the construction be such that the outthrust of the work upon the dies will be insufficient to move the cam plate, the engagement of said lug with the other inclined wall of the groove 5ª will compel the required movement of the cam plate to produce the required recession of the dies.

When the thread on a piece of work has been completed, the die carrier will have been screwed substantially as far as it can go into the work holder, and the lug 4ᵇ will be well behind the angular rear end of the projection 6ᶜ which lies between the two branches 6ª and 6ᵇ. Now, when the die carrier is unscrewed from the work holder, there will be for the time being no force at work tending to turn the cam plate in the direction which would cause the dies to move inward. Therefore the cam plate will either remain immovable or will turn in the die receding direction. In either event, the lug 4ᵇ will be drawn forward in the guideway and will enter the branch 6ᵇ thereof. Preferably the front face of the lug 4ᵇ will be inclined, as shown, so that if a part of it starts to enter the groove 6ᵇ the cam plate will be turned in the die receding direction by the engagement of the inclined front face of the lug 4ᵇ with the rear end of the partition 4ᶜ so that said lug will certainly enter the groove 6ᵇ. It will travel forward in this groove and will be guided thereby. The front end of the groove 6ᵇ being curved toward and being connected with the front end of the groove 6ª, the lug will be guided into the groove 6ª, and the cam plate will at the same time be turned so as to set the dies in approximately the correct position to start the cutting of a thread. If, now, the die carrier be screwed into the work holder one turn, or thereabout, before the dies are caused to engage the work, part of the lug 4ᵇ will pass the front end of the partition 6ᶜ and thereby, so far enter the groove 6ª that it must travel therein when the die carrier is screwed into the work holder.

In the particular construction shown the adjustability of the die stock to adapt it for cutting threads on work of different diameters is attained by the construction which permits the templet bar 6 to be adjusted circumferentially upon the ring 5. To permit this, said ring has a lateral projection 5ᵇ in which is an arcual slot 5ᶜ. The lower end of the templet bar enters this slot and is correspondingly shaped so as to prevent it from turning therein; and said templet bar has a rearwardly projecting threaded stem 6ᵉ which passes through the slot. By screwing a nut 9 onto this stem against the rear face of the ring, the templet bar will be rigidly fixed to the ring at any desired position relative thereto. It will, of course, be understood that as the templet bar is moved circumferentially upon the ring, the cam plate must move to a like extent in the same direction, and this affords the means for adjusting the tool for different diameters of work. This particular means for securing this adjustment is not, however, essential to the invention. In fact, the same result could be obtained if the templet bar were not adjustable upon the ring, provided the lug of the cam plate had an adjustable connection with said cam plate,—which is also familiar construction in this art.

Attention is called to a rather important adjunctive feature of construction which is shown clearly enough for the purpose by the dotted lines in Fig. 2, to wit; there is a groove 6ᵈ in the inner face of the templet bar which extends from the front end thereof rearward until it unites with the endless guide groove 6ª, 6ᵇ. It is through this open ended groove 6ᵈ that the pin 4ᵇ on the cam plate may be introduced into or withdrawn from said endless guideway, when, for example, it is desired to change the dies.

Having described my invention, I claim:—

1. In a die stock, the combination of a tubular work holder adapted to be clamped upon the work, a tubular die carrier which is rotatably and longitudinally movable relatively to the work holder, radially movable dies mounted upon the die carrier, a cam plate rotatably mounted upon the die carrier and engaging with the dies to control their position, a ring which is rotatable upon the work holder in unison with the die carrier but has no longitudinal movement relative to the work holder, a templet bar fixed to said ring and extending therefrom longitudinally forward, which templet bar has on its inner face an endless guideway having two branches which extend in a general forward and backward direction and are connected at their front and rear ends, and a lug which projects laterally from the cam plate and engages with said guideway.

2. In a die stock, the combination of a tubular work holder adapted to be clamped upon the work, a tubular die carrier which is rotatably and longitudinally movable relatively to the work holder, radially movable dies mounted upon the die carrier, a cam plate rotatably mounted upon the die carrier and engaging with the dies to control their position, a ring which is rotatable upon the work holder in unison with the die carrier but has no longitudinal movement relative to the work holder, a templet bar fixed to said ring and extending therefrom longitudinally forward, which templet bar has on its inner face an endless guide groove having two branches which extend in a general forward and backward direction and are connected at their front and rear ends, and a lug which projects out from said cam into said guideway, and has a beveled front face.

3. In a die stock, the combination of a tubular work holder adapted to be clamped upon the work, a tubular die carrier which is rotatably and longitudinally movable relatively to the work holder, radially movable dies mounted upon the die carrier, a cam plate rotatably mounted upon the die carrier and engaging with the dies to control their position, a ring which is rotatable upon the work holder in unison with the die carrier but has no longitudinal movement relative to the work holder, a templet bar fixed to said ring and extending therefrom longitudinally forward, which templet bar has on its inner face an endless guideway having two branches which extend in a general forward and backward direction and are connected at their front and rear ends, a lug which projects laterally from the cam plate and engages with said guideway, and means whereby the cam plate may be turned independently of any movement of the die carrier and work holder for the purpose of adjusting the dies for work of different diameters, and without withdrawing the lug on the cam plate from its engagement with said guideway.

4. In a die stock, the combination of a tubular work holder adapted to be clamped upon the work, a tubular die carrier which is rotatably and longitudinally movable relatively to the work holder, radially movable dies mounted upon the die carrier, a cam plate rotatably mounted upon the die carrier and engaging with the dies to control their position, a ring which is rotatable upon the work holder in unison with the die carrier but has no longitudinal movement relative to the work holder, a templet bar which is adjustable circumferentially on the ring and extends therefrom longitudinally forward, which templet bar has on its inner face an endless guideway having two branches which extend in a general forward and backward direction and are connected at their front and rear ends, and a lug which projects laterally from the cam plate and engages said guideway.

5. In a die stock, the combination of a tubular work holder adapted to be clamped upon the work, a tubular die carrier which is rotatably and longitudinally movable relative to the work holder, radially movable dies mounted upon the die carrier, a cam rotatably mounted upon the die carrier and engaging the dies to control their position, a ring which is rotatable upon the work holder in unison with the die carrier, but has no longitudinal movement relative to the work holder, a templet bar fixed to said ring and extending therefrom longitudinally forward, which templet bar has on its inner face two approximately parallel guideway branches which extend in a general forward and backward direction, a lug which extends laterally from said cam plate into engagement with one of said guideway branches, said guideway branches being connected at one end at least whereby the lug may pass from one guideway branch into the other.

6. In a die stock, the combination of a tubular work holder adapted to be clamped upon the work, a tubular die carrier which is rotatably and longitudinally movable relative to the work holder, radially movable dies mounted upon the die carrier, a cam rotatably mounted upon the die carrier and engaging the dies to control their position, a ring which is rotatable upon the work holder but has no longitudinal movement relative to the work holder, a templet bar fixed to said ring and extending therefrom longitudinally forward, which templet bar has on its inner face one substantially straight but inclined guideway and a second guideway which at its rear end branches and bends away from the first named guideway and extends therefrom forward in a direction approximately parallel with said first named guideway, and a lug which projects laterally from the cam plate and engages said guideway.

In testimony whereof, I hereunto affix my signature in the presence of two witnesses.

RUSSELL B. TEWKSBURY.

Witnesses:
E. L. THURSTON,
A. J. HUDSON.

Copies of this patent may be obtained for five cents each, by addressing the "Commissioner of Patents, Washington, D. C."